(12) United States Patent
Melville

(10) Patent No.: US 11,320,657 B2
(45) Date of Patent: May 3, 2022

(54) WAVEGUIDE DISPLAY WITH CANTILEVERED LIGHT SCANNER

(71) Applicant: Magic Leap, Inc., Plantation, FL (US)

(72) Inventor: Charles David Melville, Camano Island, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/061,338

(22) Filed: Oct. 1, 2020

(65) Prior Publication Data
US 2021/0088794 A1    Mar. 25, 2021

Related U.S. Application Data

(63) Continuation of application No. PCT/US2019/025534, filed on Apr. 3, 2019.

(60) Provisional application No. 62/652,049, filed on Apr. 3, 2018.

(51) Int. Cl.
*G02B 27/01* (2006.01)

(52) U.S. Cl.
CPC ..... *G02B 27/0172* (2013.01); *G02B 27/0176* (2013.01); *G02B 2027/0154* (2013.01); *G02B 2027/0178* (2013.01)

(58) Field of Classification Search
CPC .............. G02B 27/017; G02B 27/0172; G02B 27/0176
See application file for complete search history.

(56) References Cited

U.S. PATENT DOCUMENTS

| | | | |
|---|---|---|---|
| 2011/0201914 A1* | 8/2011 | Wang | A61B 5/418 600/407 |
| 2015/0059002 A1* | 2/2015 | Balram | G06F 1/163 726/28 |
| 2015/0235431 A1* | 8/2015 | Schowengerdt | G02B 3/0006 345/633 |
| 2015/0377738 A1* | 12/2015 | Dorfman | G02B 6/28 356/73.1 |
| 2016/0324403 A1* | 11/2016 | Yeoh | A61B 1/00165 |
| 2018/0052277 A1 | 2/2018 | Schowengerdt et al. | |
| 2018/0275396 A1 | 9/2018 | Schowengerdt et al. | |
| 2020/0152105 A1* | 5/2020 | Ishii | G09G 5/00 |

FOREIGN PATENT DOCUMENTS

| | | |
|---|---|---|
| WO | 2015081313 A2 | 6/2015 |
| WO | 2019195390 A1 | 10/2019 |

OTHER PUBLICATIONS

PCT/US2019/025534, "International Preliminary Report on Patentability", dated Oct. 15, 2020, 8 pages.
PCT/US2019/025534, "International Search Report and Written Opinion", dated Jun. 21, 2019, 9 pages.

* cited by examiner

*Primary Examiner* — Alexander Eisen
*Assistant Examiner* — Cory A Almeida
(74) *Attorney, Agent, or Firm* — Kilpatrick Townsend & Stockton LLP

(57) ABSTRACT

This disclosure includes a description of a pair of virtual or augmented reality glasses that includes an optical scanning system that protrudes at least partially through an opening in an eyepiece of the glasses. The optical scanning system includes an optical fiber or cantilevered beam that extends through the opening and a transducer that drives the optical fiber or cantilevered beam to move in a spiral pattern.

20 Claims, 14 Drawing Sheets

WAVEGUIDE DISPLAY WITH CANTILEVERED LIGHT SCANNER

CROSS REFERENCE TO RELATED APPLICATIONS

This application is a continuation of International Patent Application No. PCT/US2019/025534, filed Apr. 3, 2019, entitled "WAVEGUIDE DISPLAY WITH CANTILEVERED LIGHT SCANNER," which claims the benefit of and priority to U.S. Provisional Patent Application No. 62/652,049, filed Apr. 3, 2018, entitled "WAVEGUIDE DISPLAY WITH CANTILEVERED LIGHT SCANNER," the entire disclosures of which are hereby incorporated by reference, for all purposes, as if fully set forth herein.

BACKGROUND OF THE INVENTION

Modern computing and display technologies have facilitated the development of systems for virtual or augmented reality experiences, where digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR" scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

This disclosure describes various embodiments that relate to transducers for manipulating fiber or cantilevered beam scanners. In particular, different types of transducers or scanning actuators are described.

According to an embodiment of the present invention, augmented reality glasses are described and include the following: an eyepiece including an incoupling grating, a hole formed in the eyepiece proximate the incoupling grating; a transducer capable of generating mechanical movement; a cantilever including a proximal end coupled to the transducer and a distal end; and a light-emitting member disposed on the cantilever, wherein the cantilever extends through the hole formed in the eyepiece.

According to an embodiment of the present invention, an optical scanner is described and includes the following: a frame; a hub; at least one transducer coupled to the frame and to the hub; and a cantilever including a proximal end coupled to the hub and a light-emitting free distal end.

According to a specific embodiment of the present invention, augmented reality glasses are disclosed and include the following: a waveguide display eyepiece including an incoupling grating, a hole formed in the waveguide display eyepiece proximate the incoupling grating; the optical scanner described above positioned relative to the hole formed in the waveguide such that the cantilever extends through the hole formed in the waveguide; and an optical element arranged facing the light-emitting distal free end.

Numerous benefits are achieved by way of the present invention over conventional techniques. For example, embodiments of the present invention provide methods and systems that can be used to display images to a user in a form factor comparable to standard eyeglasses. In some embodiments, image projectors integrated with a fiber scanning light source can fit within the frames of the eyeglasses. These and other embodiments of the invention along with many of its advantages and features are described in more detail in conjunction with the text below and attached figures.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF THE INVENTION

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting, such that other embodiments may be used, and changes may be made without departing from the spirit and scope of the described embodiments.

Figure 1:
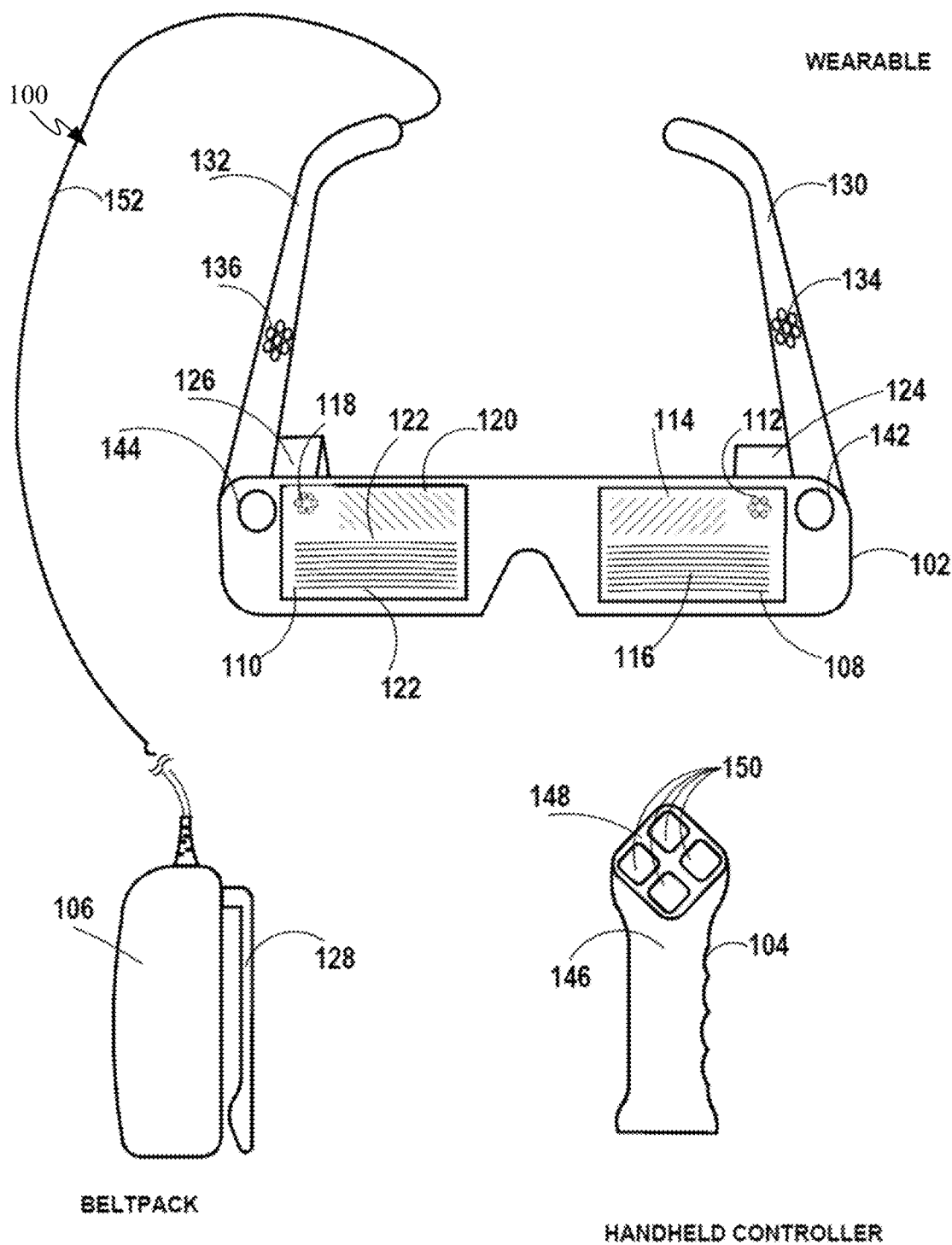
FIG. 1 shows an exemplary augmented reality device suitable for use with the described embodiments.

FIG. 1 shows an exemplary augmented reality system 100 according to an embodiment of the invention. As shown in FIG. 1, the system 100 includes augmented reality headgear 102, a handheld controller 104, and an auxiliary unit 106. The augmented reality headgear 102 includes a left (user's left) transparent waveguide set eyepiece (herein below "left eyepiece") 108 and a right transparent waveguide set eyepiece (herein below "right eyepiece") 110. Each eyepiece 108, 110 includes surface diffractive optical elements for controlling the flow of imagewise modulated light. In particular, the left eyepiece 108 includes a left incoupling grating 112, a left orthogonal pupil expansion (OPE) grating 114 and a left exit (output) pupil expansion (EPE) grating 116. Similarly, the right eyepiece 110 includes a right incoupling grating 118, a right OPE grating 120 and a right EPE grating 122. Imagewise modulated light is transferred via the incoupling gratings 112, 118, OPEs 114, 120 and EPE 116, 122 to a user's eye. Alternatively, in lieu of the incoupling grating 112, 118, OPE grating 114, 120 and EPE grating 116, 122, the eyepieces 108, 110 include refractive and reflective features for controlling the coupling of imagewise modulated light to the user's eyes.

A left source of imagewise modulated light 124 is optically coupled into the left eyepiece 108 through the left incoupling grating set 112 and a right source of imagewise modulated light 126 is optically coupled into the right eyepiece 110 through the right incoupling grating set 118. The incoupling grating sets 112, 118 deflect light from sources of imagewise modulated light 124, 126 to angles above the critical angle for Total Internal Reflection (TIR) for the eyepieces 108, 110. The OPE grating sets 114, 120 incrementally deflect light propagating by TIR down toward the EPE grating sets 116, 122. The EPE grating sets 116, 122 incrementally couple light out toward the user's face including the user's eyes' pupils.

The auxiliary unit 106 can include a battery to provide energy to operate the system 100, and can include a processor for executing programs to operate the system 100. As shown, the auxiliary unit 106 includes a clip 128 that is useful for attaching the auxiliary unit 106 to a user's belt. Alternatively, the auxiliary unit 106 can have a different form factor.

The augmented reality headgear 102 also includes a left temple arm 130 and a right temple arm 132. The left temple arm 130 includes a left temple speaker port 134 and the right temple arm 132 includes a right temple speaker port 136. The handheld controller 104 includes a grip portion 146 and a top 148 that includes a plurality of buttons 150. The auxiliary unit 106 is coupled to the headgear 102 through a cable 152, which can, for example, include electrical wires and fiber optics. Wireless connections between the auxiliary unit 106 and the headgear 102 can also be used.

Figure 2:
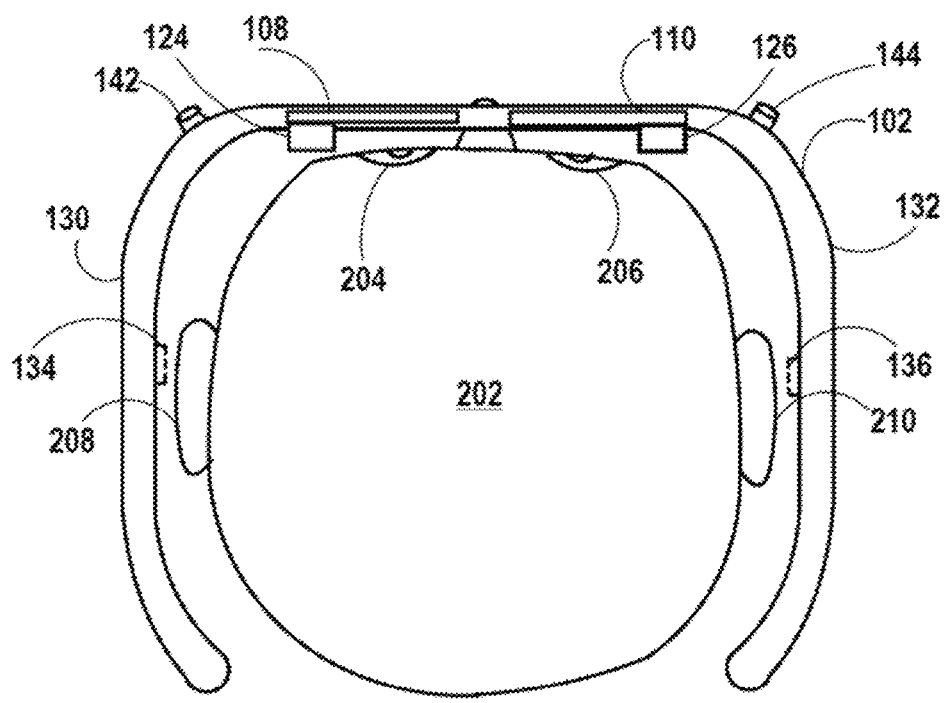
FIG. 2 shows a top view of the augmented reality device shown in FIG. 1.

FIG. 2 shows a top view of augmented reality headgear 102 positioned on a user's head 202. As positioned, eyepieces 108 and 110 are aligned with eyes 204 and 206 of user's head 202. Further, FIG. 2 shows how ears 208 and 210 are aligned with respective speaker ports 134 and 136. World cameras 142 and 144 are shown oriented outwardly to cooperatively cover a front facing portion of a user's field of view. In this way, augmented reality headgear 102 is able to incorporate digital content with real-world items surrounding the user. In some embodiments, world cameras 142 and 144 can include or cooperatively operate in conjunction with depth detection sensors to fully characterize a user's surroundings.

Sources of imagewise modulated light 124 and 126 are shown affixed to a rear-facing surface of respective eyepieces 108 and 110, allowing for projection of visual content into eyepieces 108 and 110. FIG. 2 also shows how temple arms 130 and 132 position temple speaker ports 134 and 136 proximate respective ears 208 and 210. In this way, audio content can be delivered directly to the ears of a user.

Figure 3A:
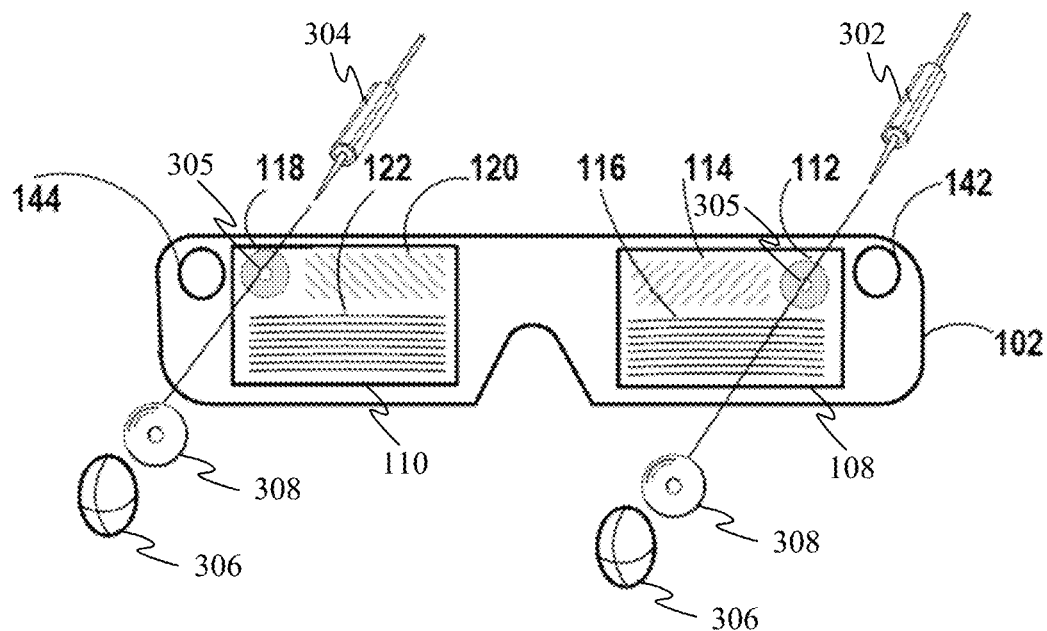
FIG. 3A shows an exploded view of a display assembly of the augmented reality device shown in FIG. 1.

FIG. 3A shows an exploded view of augmented reality system 100 in which sources of image-modulated light take the form of fiber scanners 302 and 304 that extend through respective openings 305 defined by incoupling gratings 112 and 118. For illustrative purposes, the sizes of fiber scanners 302 and 304 are enlarged relative to augmented reality headgear 102. Light emitted by fiber scanners 302 and 304 can be reflected back toward incoupling gratings 112 and 118 by concave mirrors 306. Lenses 308 can help collimate, magnify and direct the reflected light into incoupling gratings 112 and 118. It should be noted that a relative size of incoupling gratings 112 and 118 is also enlarged here for illustrative purposes. For example, incoupling gratings 112 and 118 could each have a diameter of about 1 millimeter. Reflected and collimated light received by incoupling gratings 112 and 118 is routed through respective OPEs 114 and 120 and EPEs 116 and 122 within eyepieces 108 and 110. EPEs 116 and 122 decouple the light received from fiber scanners 302 and 304 out of eyepieces 108 and 110 toward the eyes of a user.

Figure 3B:
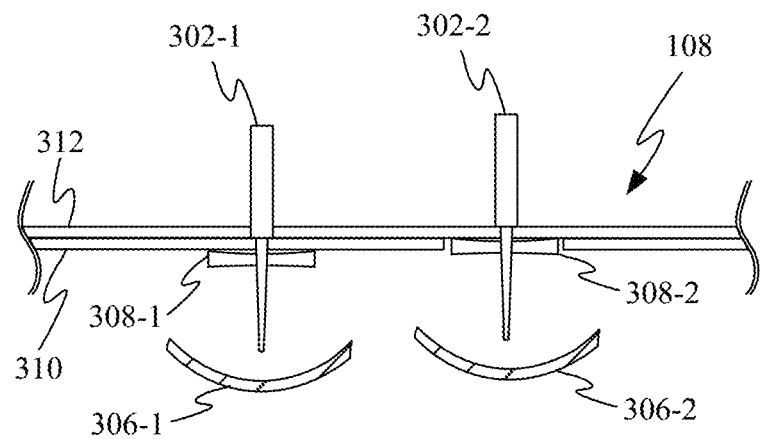
FIG. 3B shows a cross-sectional view of an incoupling grating region of an eyepiece embodiment that includes multiple fiber scanners according to an embodiment of the present invention.

FIG. 3B shows a cross-sectional view of an incoupling grating region of an eyepiece embodiment that includes multiple fiber scanners. A portion of eyepiece 108 is depicted including two separate waveguide layers 310 and 312. Having multiple layers allows for different color channels and/or different depth planes to be presented to a user of augmented reality system 100. Each depth plane corresponds to a virtual image distance. The virtual image distance that is output by a particular waveguide plane can be controlled by curving the grating lines of the EPE of the particular waveguide plane in order to impart a diverging wavefront curvature to light emitted by the EPE toward the user's eye. As depicted, light emitted by fiber scanner 302-1 would be received by waveguide layer 310 and light emitted by fiber scanner 302-2 would be received by waveguide layer 312.

In some embodiments, opening 305 can be formed in waveguide 110 or 310 and 312, using a laser perforation method followed by an etching method. In some embodiments, the laser perforation and etching methods can be part of a larger multi-step manufacturing/assembly method. The perforation method can include forming small, spaced-apart perforation holes outlining the desired shape of the hole (e.g. circular, oval, triangular, square, polygonal, etc.). The size of the perforation holes created can be about 2-4 microns in diameter. In some embodiments, the perforation method is completed using a laser tool to create the small perforation holes. Prior to beginning the etching method, a barrier can be provided over portions of the waveguide that are not intended to be etched. In some embodiments, the portions not intended to be etched include any portion of the waveguide outside of the perforated outline. An example barrier can be a dam type structure disposed on the waveguide and configured to contain etching fluid so that the fluid touches only the portion of the waveguide intended to be etched. Alternatively, the barrier can be a protective coating or film disposed over portions of the waveguide not intended to be etched. The dam and/or protective coating structures may be removed after the etching step is complete. A multi-step method as described can improve edge quality of holes between 1-5 mm in width by providing a smoother finish and fewer stress risers as compared to edges created by perforation alone. Additionally, by perforating the shape outline prior to etching, duration of the etching step may be reduced. The perforation and etching method together provide a well-defined and predictably sized hole through which fiber scanners 302 can extend through the waveguides.

Figure 4A:
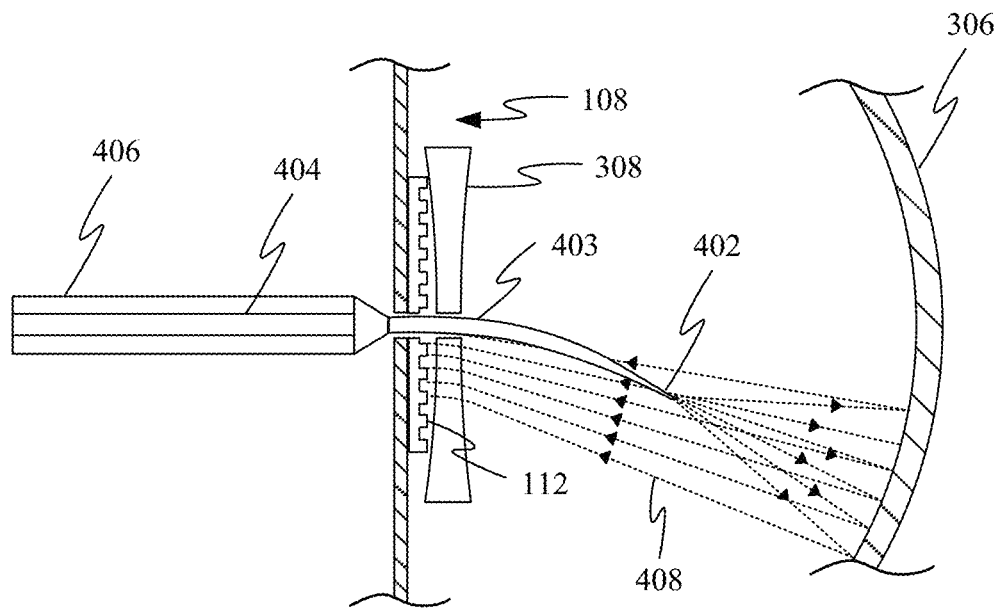
FIGS. 4A-4B show how a distal end of a tapered fiber can extend through an opening defined by an incoupling grating and move in a predefined scan pattern according to an embodiment of the present invention.
Figure 4B:
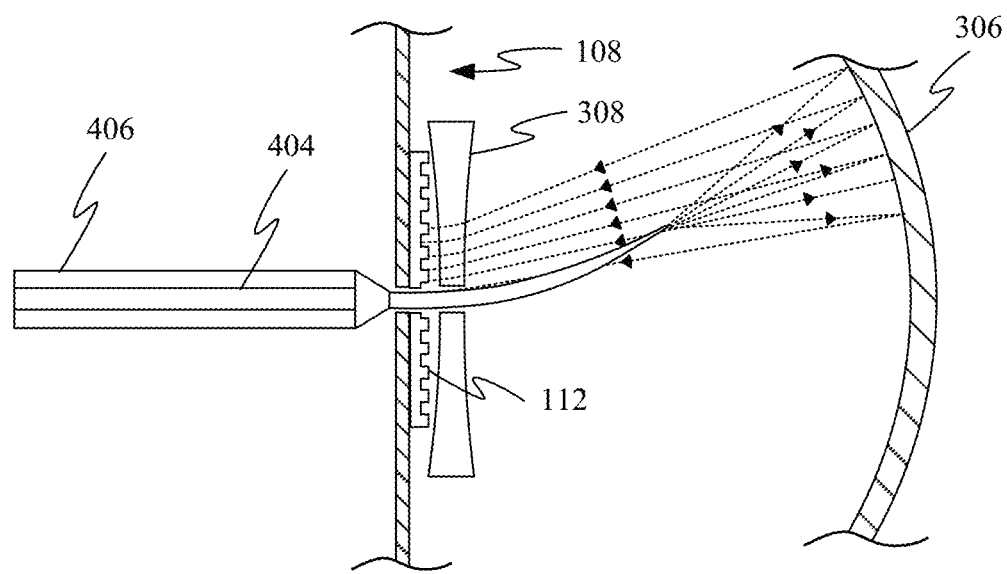

FIGS. 4A-4B show how a distal end 402 of tapered fiber 404 can extend through an opening defined by incoupling grating 112 and move in a predefined scan pattern. A distal end 402 of tapered fiber 404 is shown extending through openings in incoupling grating 112 of eyepiece 108, lens 308 and the waveguide plane. FIGS. 4A and 4B also show different positions of distal end 402 of tapered fiber 404 as fiber actuator 406 maneuvers proximal end 403 to achieve the predefined scan pattern. In some embodiments, the scan pattern can be a circular or spiral pattern along which light emitted by distal end 402 emits light 408 configured to generate an image for display to a user. A source of modulated light such as one or more laser diodes (not shown) is coupled to tapered fiber 404 and the light emitted by the one or more laser diodes is modulated in coordination with the movement of the distal end of fiber 404 in the predefined scan pattern, such that, when the distal end of the fiber is at a positon that corresponds to a particular pixel, the source of modulated light is modulated to output light at an intensity level (and, optionally, color coordinates) corresponding to that particular pixel. Light 408 emitted by distal end 402 spreads out and is then reflected back toward lens 308 by concave mirror 306. The combination of lens 308 and mirror 306 collimates the light and directs the light into incoupling gratings 112 at an angle determined by the instantaneous position of distal end 402 of tapered fiber 404. Concave mirror 306 can be coupled to eyepiece 108 by a cylindrical tube (not shown) with walls having light absorbing properties configured to prevent reflection of any stray light. A portion of the eyepiece to which the cylindrical tube attached can be silvered prior to being bonded to the cylindrical tube. After light 408 is reflected back toward eyepiece 108, lens 308 then redirects light 408 into incoupling grating 112. In some embodiments, lens 308 can be a negative lens that collimates the reflected light prior to it being received at an incoupling grating of eyepiece 108. As described above, light received at incoupling grating 112 is then projected back out toward a user's eye by an EPE grating as described above.

Figure 4C:
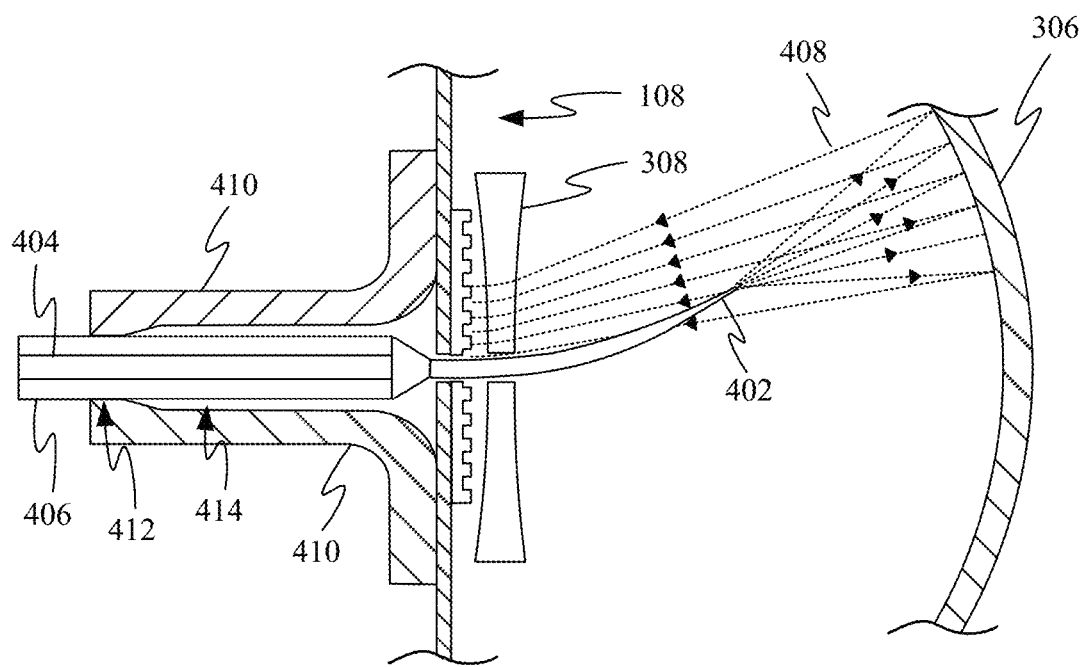
FIG. 4C shows how a fiber actuator can be affixed to a rear-facing surface of an eyepiece by a bracket according to an embodiment of the present invention.

FIG. 4C shows how fiber actuator 406 can be affixed to a rear-facing surface of eyepiece 108 by a bracket 410. In some embodiments, bracket 410 can be adhesively affixed to the rear-facing surface of eyepiece 108. An opening defined by bracket 410 that accommodates fiber actuator 406 can have the same size as or be slightly larger than a diameter of fiber actuator 406. Sizing the opening to be slightly larger than fiber actuator 406 allows bracket 410 to accommodate lateral shifting of fiber actuator 406 when needed to induce rotation of tapered fiber 404. As depicted, a first portion 412 of the opening near a rear end of fiber actuator 406 can be sized to hold fiber actuator 406 in place. A second region 414 of the opening can be enlarged to allow lateral motion of fiber actuator 406.

Figure 4D:
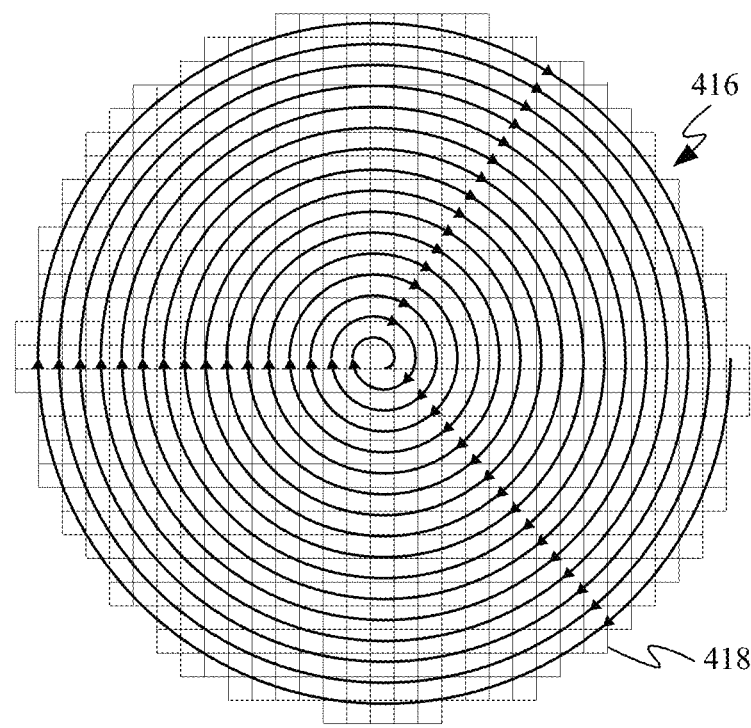
FIG. 4D shows an exemplary spiral scan pattern that can be traversed by a distal end of a tapered fiber according to an embodiment of the present invention.

FIG. 4D shows an exemplary spiral scan pattern 416 traversed by distal end 402 of tapered fiber 404. While arrows show scan pattern 416 turning in a clockwise pattern, it should be understood that scan direction can vary. For example, after a clockwise scan being completed, a counter-clockwise scan can be initiated from a central region of spiral scan pattern 416, thereby resulting in a reversal in direction of depicted scan pattern 416. The depicted grid of squares 418 can represent pixel locations traversed by spiral scan pattern 416. Because a speed of distal end 402 can vary over the course of spiral scan pattern 416, a rate at which light is modulated through tapered fiber 404 can be adjusted to correspond to different colors of light being emitted in a corresponding pixel locations. For example, since distal end 402 of tapered fiber 404 can travel more slowly through a central portion of scan pattern 416, a rate at which light signals are modulated can be slowed as distal end 402 approaches the central portion or the rate can remain substantially the same, resulting in a higher spatial resolution at the central portion of scan pattern 416. It should be understood that other variations and permutations of the modulation rate are possible.

Figure 4E:
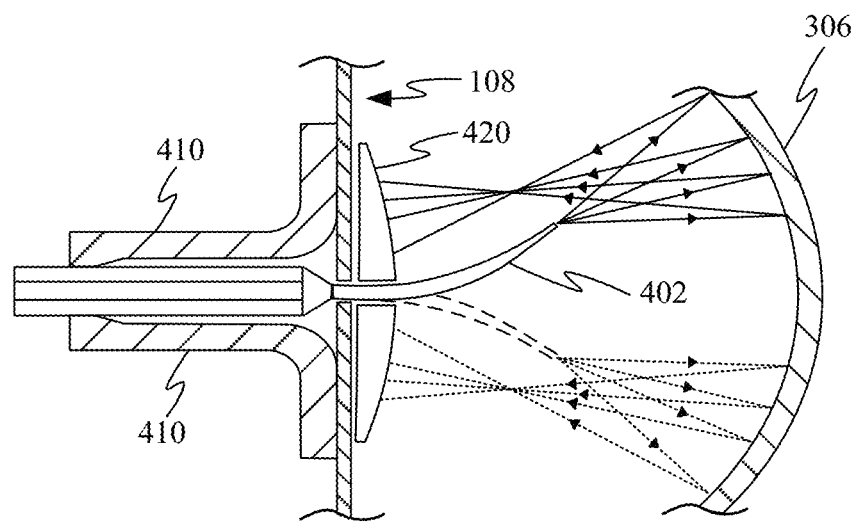
FIGS. 4E-4F show embodiments where a concave mirror used to reflect light into an incoupling grating has an increased curvature and positive lens in lieu of the previously depicted negative lens according to an embodiment of the present invention.
Figure 4F:
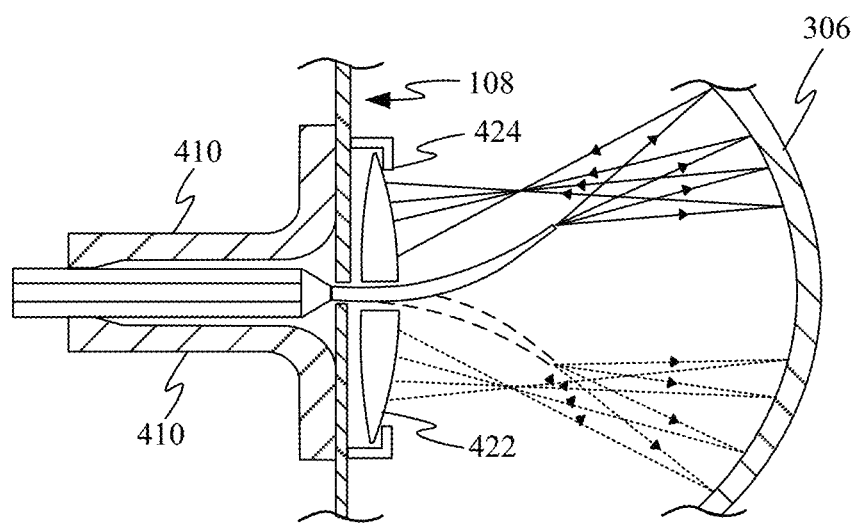

FIGS. 4E-4F show embodiments where concave mirror 306 has an increased curvature and positive lens 420, 422 is used in lieu of the previously depicted negative lens 308. FIG. 4E shows how a shape of lens 420 can be adjusted to account for the increased curvature of concave mirror 306. The new lens shape can be required due to the change in shape of mirror 306. In some embodiments, a surface of concave mirror 306 facing lens 420 can have a spherical geometry. FIG. 4F shows how a bracket 424 can be used to keep lens 422 affixed to eyepiece 108. In some embodiments, concave mirror 306 can also be affixed to eyepiece 108 by another bracket (not shown). Brackets in direct contact with eyepiece 108 can be affixed to eyepiece 108 over an optically reflective or silvered layer of metal configured to help prevent an interface between brackets and eyepiece 108 from adversely affecting the distribution of light within eyepiece 108.

Figure 5:
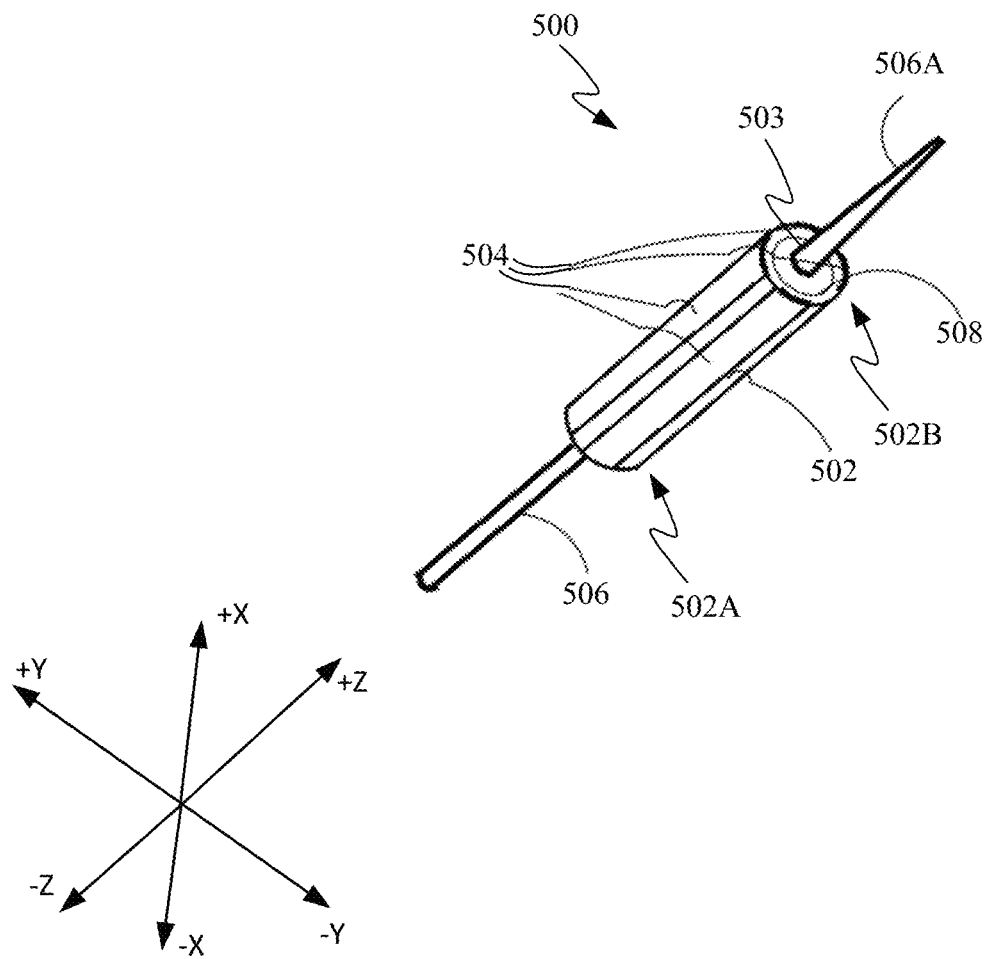
FIG. 5 shows a perspective view of a piezoelectric motion actuator assembly according to an embodiment of the present invention.

FIG. 5 shows a perspective view of a piezoelectric motion actuator assembly 500 according to an embodiment of the present invention. Piezoelectric motion actuator assembly 500 illustrated in FIG. 5 includes four drive electrodes 504 (+X, −X, +Y, and −Y) disposed on a piezoelectric tube 502. An optical fiber 506 extends through an axial bore 503 defined in piezoelectric tube 502. A common cylindrical electrode 508 is disposed on an internal cylindrical surface of axial bore 503. The optical fiber includes a tapered free end 506A. A bottom end 502A of piezoelectric tube 502 may be attached to a support structure (not shown) and a top end 502B of the piezoelectric tube 502 may be free to move. By actuating the four actuation inputs associated with drive electrodes 504, the top end 502B of piezoelectric tube 502 can be induced to move and to transfer mechanical energy to the tapered free end 506A of optical fiber 506. In FIG. 5, contraction of the +X actuation input and expansion of the −X actuation input cause the piezoelectric motion actuator assembly 500 to tilt toward the +X-axis. Although the motion described is in two dimensions (i.e., along planes defined by the x-axis and y-axis, which are transverse directions orthogonal to the longitudinal direction aligned with the z-axis), embodiments can also expand or contract all four actuation inputs in unison to contract/expand along the z-axis. Thus, embodiments of the present invention provide for both motion in the x-direction and y-direction, as well as the use of cylindrical actuators that compress/expand in the z-direction.

Figure 6:
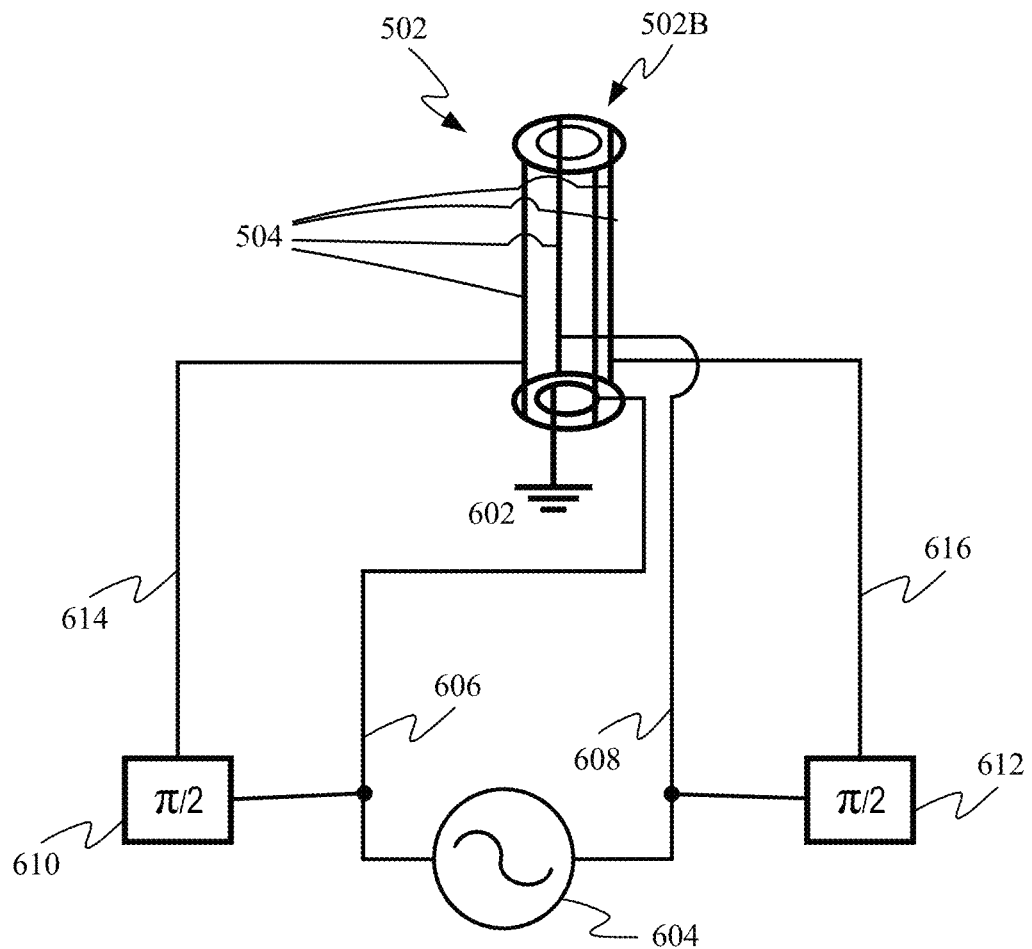
FIG. 6 shows a simplified side view illustrating a motion actuation structure according to an embodiment of the present invention.

FIG. 6 shows an electric schematic for a circuit for driving the piezoelectric motion actuator assembly 500. As illustrated in FIG. 6, piezoelectric tube 502 includes multiple piezoelectric elements. Piezoelectric tube 502 can be referred to as a piezoelectric transducer or piezoelectric motion actuator. In addition to piezoelectric transducers, thermal transducers that includes a heater including material that exhibits a property of expanding when heated can be utilized to provide motion actuation. The lower portion of the piezoelectric tube 502 is attached to a fixed base, enabling the top of the structure to move in response to the electrode drive voltages. For purposes of clarity, drive electrodes 504, which provide actuation inputs (see FIG. 5), on the outside surfaces of the piezoelectric elements are illustrated schematically as simple lines as opposed to the strip shaped drive electrodes, as depicted in FIG. 5. The interior of the piezoelectric tube 502 is metallized and connected to ground 602. In some embodiments, four phases are applied to the actuation inputs arranged at 90° orientations with respect to each other around the outside surfaces of the piezoelectric elements. In some embodiments, a fiber optic with modulated light can extend through piezoelectric tube 502. Thus, piezoelectric tube 502 is useful not only for mechanical functionality but for light delivery as well.

Signal generator 604 provides outputs that are connected to electrodes 606 and 608, which are, in turn, connected to corresponding actuation inputs (e.g., +Y, and −Y in FIG. 5). Signal generator 604 is also connected to a first 90° phase shifter 610 and a second 90° phase shifter 612, which are connected to electrodes 614 and 616, which are, in turn connected to corresponding actuation inputs (e.g., +X and −X in FIG. 5). Thus, signal generator 604, in concert with the phase shifters, provides four phases that are 90° out of phase with respect to each other, and connected to electrodes that are spaced by 90 degrees from each other around the piezoelectric tube 502.

In operation, the field is applied radially from the actuation inputs on the outer surface of the piezoelectric element to the common grounded electrode on the inner surface of the piezoelectric element. Because the left/right and front/back actuation inputs are driven by electrodes that are 180° out of phase, contraction of the left/front side of the piezoelectric element and expansion of the right/back side of the piezoelectric element results in bending of the piezoelectric element in left/right and front/back directions.

As the voltages applied to the four actuation inputs of each actuation input are varied as a function of time, the free end 502B of piezoelectric tube 502 can sweep out a circular or spiral pattern aligned with a longitudinal axis of piezoelectric tube 502 (i.e., the z-direction). In some embodiments, the sweep pattern can correspond to a resonant frequency of the tapered free end 506A of optical fiber 506 extending through piezoelectric tube 502, helping to reduce an amount of energy for the sweep pattern to be maintained.

Figure 7:
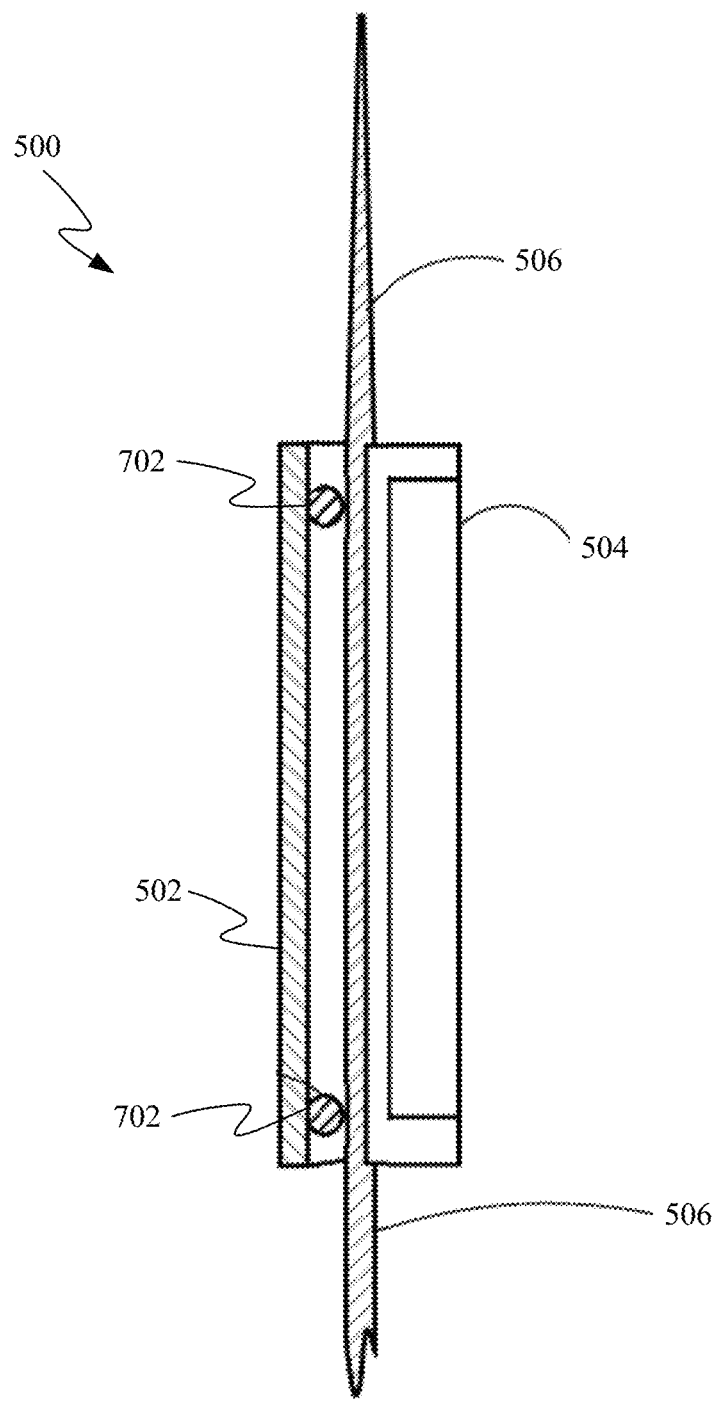
FIG. 7 shows a partial cross-sectional view of a piezoelectric motion actuator assembly.

FIG. 7 shows a partial cross-sectional view of piezoelectric motion actuator assembly 500. Tapered optical fiber 506 is shown extending all the way through piezoelectric tube 502. Securing rings 702 can be positioned at opposing ends of piezoelectric tube 502 and be designed to keep tapered optical fiber 506 stabilized within piezoelectric tube 502. In some embodiments, securing rings 702 can take the form of annular rubber gaskets or adhesive configured to retain tapered optical fiber 506 centered within an opening defined by piezoelectric tube 502 during scanning.

Figure 8:
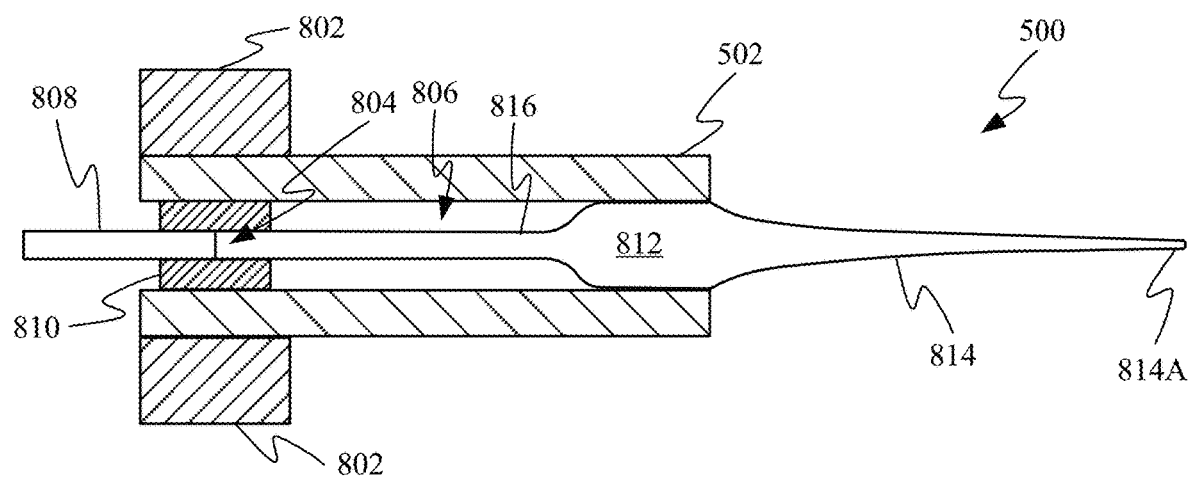
FIG. 8 is a simplified cross-sectional side view illustrating a multi-element shaped fiber assembly according to another embodiment of the present invention.

FIG. 8 is a simplified cross-sectional side view illustrating a multi-element shaped fiber assembly according to another embodiment of the present invention. In this implementation, piezoelectric tube 502 is attached to a mechanical mount using supports 802, which can also be referred to as an attachment collar. The piezoelectric tube 502 vibrates relative to the base (not shown) to which supports 802 are attached. In this embodiment, a splice joint 804 joins optical fiber segment 806 to optical fiber 808 and is positioned between supports 802 to which piezoelectric tube 502 is also coupled.

As shown in FIG. 8, a retaining element 810 is disposed within an internal orifice of piezoelectric motion actuator assembly 500. Fiber optic cable passes through retaining element 810 and the internal orifice of piezoelectric tube 502. Optical fiber segment 806 is joined to optical fiber 808 at splice joint 804, which is defined by a first fiber joint of optical fiber segment 806 (to the right of the splice joint) and a second fiber joint of optical fiber 808 (to the left of the splice joint). The splice joint is positioned longitudinally such that it is disposed in retaining element 810. The position of splice joint 804 in retaining element 810 and between supports 802 reduces the mechanical stress on the splice joint, which is an area of reduced flex, since the motion actuator is moving with respect to the supports. Optical fiber segment 806 also includes a thickened support portion 812 that can engage interior sidewalls of one end of piezoelectric tube 502. Distal end 814 includes a tapered light delivery region configured to emit light from a distal tip 814A. Optical fiber segment 806 also includes a narrowed neck region 816 that reduces a resistance of optical fiber segment 806 to bending motion induced by piezoelectric tube 502. This depicted varying diameter fiber structure can be formed by drawing and splicing operations. In some embodiments, a diameter of neck region 816 can be about 125 microns and a diameter of thickened support portion 812 can be about 200 microns.

Figure 9A:
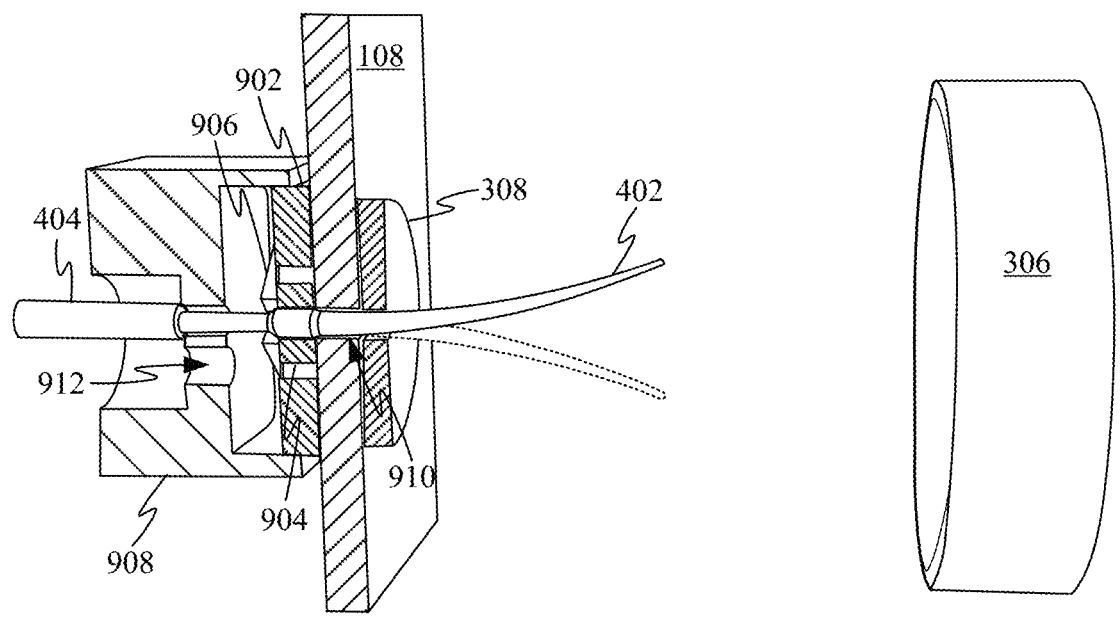
FIG. 9A shows a partial cross-sectional view of an optical scanning system incorporated into an eyepiece in accordance with the described embodiments.

FIG. 9A shows a partial cross-sectional view of an optical scanning system 900 incorporated into an eyepiece 108 in accordance with the described embodiments. Optical scanning system 900 includes tapered fiber 404, which extends through eyepiece 108. Light emitted from a distal end 402 of tapered fiber 404 is reflected back toward edge eyepiece 108 by concave mirror 306 and through lens 308. The optical scanner includes a transducer that includes a frame 902 and hub 904 driven by piezoelectric strips 906. Piezoelectric strips are coupled to both frame 902 and hub 904 to cooperatively induce oscillation of tapered fiber 404 in a predefined pattern. Bracket 908 can be configured to position tapered fiber 404, frame 902 and hub 904 relative to an opening 910 defined by eyepiece 108. Bracket 908 can also include a channel 912 for routing power and signals to optical scanning system 900. In some embodiments, bracket 908 can be affixed to another component of augmented reality headgear 102, such as temple arms 130 and 132. In this way, neither frame 902 nor hub 904 need be in direct contact with a surface of eyepiece 108, thereby preventing any interference with eyepiece 108.

Figure 9B:
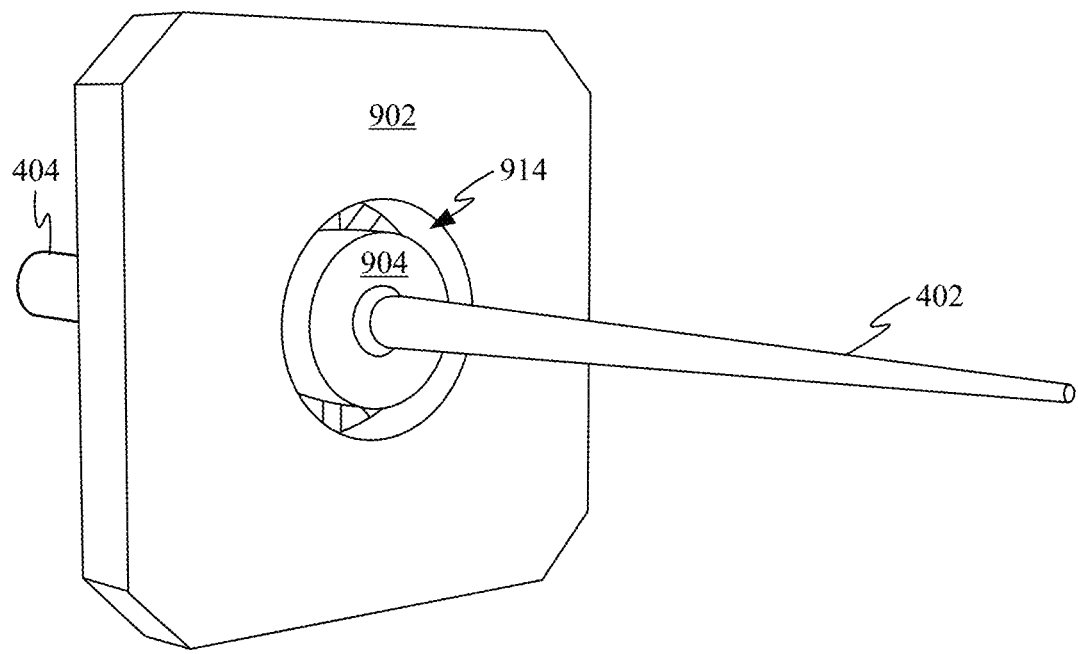
FIG. 9B shows a perspective view of a first side of an optical scanning system configured to be oriented toward an eyepiece.

FIG. 9B shows a perspective view of a first side of optical scanning system 900 configured to be oriented toward eyepiece 108. FIG. 9B illustrates a size of a gap 914 between hub 904 and frame 902. In some embodiments, hub 904 can be configured to rotate in place to achieve a desired scan pattern of tapered fiber 404 and in other embodiments, hub 904 can be configured to shift laterally to induce the desired scan pattern. The wobbling motion of hub 904 may be such that the tip of a vector normal to the surface of the hub (aligned with the resting alignment of the fiber 404) would trace out a circle in space. While hub 904 is depicted having a circular shape, it should be appreciated that many other shapes, such as elliptical, rectangular and other polygonal gap geometries, are also possible.

Figure 9C:
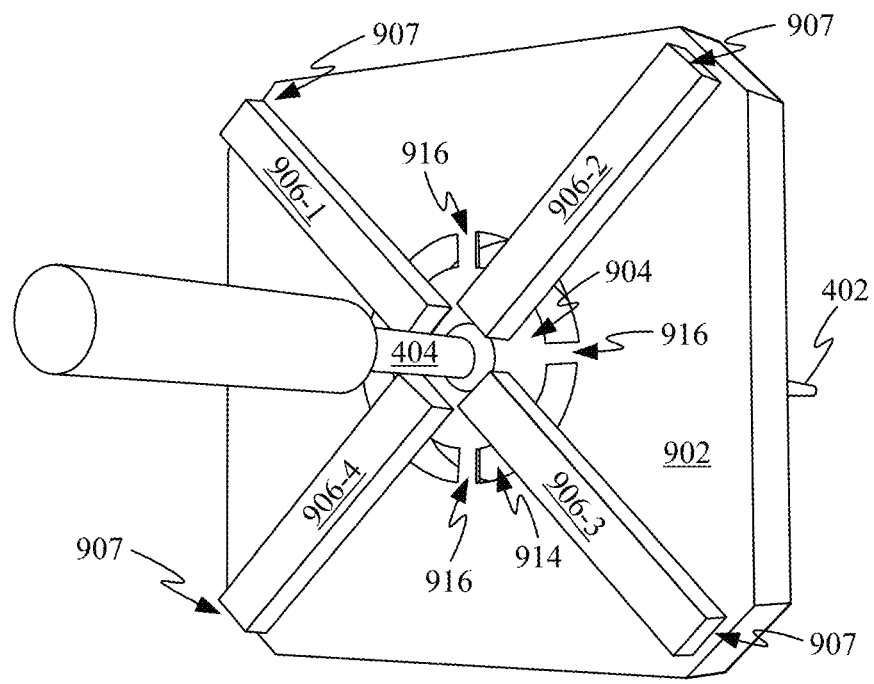
FIG. 9C shows a perspective view of a second side of an optical scanning system and illustrates how a hub can be coupled to a frame by multiple flexures.

FIG. 9C shows a perspective view of a second side of optical scanning system 900 and how hub 904 can be coupled to frame 902 by multiple flexures 916. Strain sensors 918 can be positioned on or partly overlying flexures 916. When actuated piezoelectric strips 906 extend and contract longitudinally, hub 904 is maneuvered in a pattern that causes distal end 402 of tapered fiber 404 to move in a helical pattern. This movement can be accomplished by sequentially actuating piezoelectric strips 906. For example, piezoelectric strip 906-1 can be actuated first, followed by piezoelectric strip 906-2, followed by 906-3 and then 906-4. In some embodiments, piezoelectric strips on opposing sides of hub 904, such as piezoelectric strips 906-1 and 906-3, can be actuated concurrently where 906-1 extends longitudinally and 906-3 contracts longitudinally. By varying actuation of piezoelectric strips varying scan patterns can be achieved. Piezo electric strips can be powered by electrical current routed along a surface of frame 902. Electrically conductive pathways can route power to silicon pads that both electrically and mechanically couple piezoelectric strips 906 to frame 902. Because only one end 907 of each piezoelectric strip 906 is attached to frame 902, piezoelectric strips 906 are able to shift laterally to accommodate movement of hub 904.

Figure 9D:
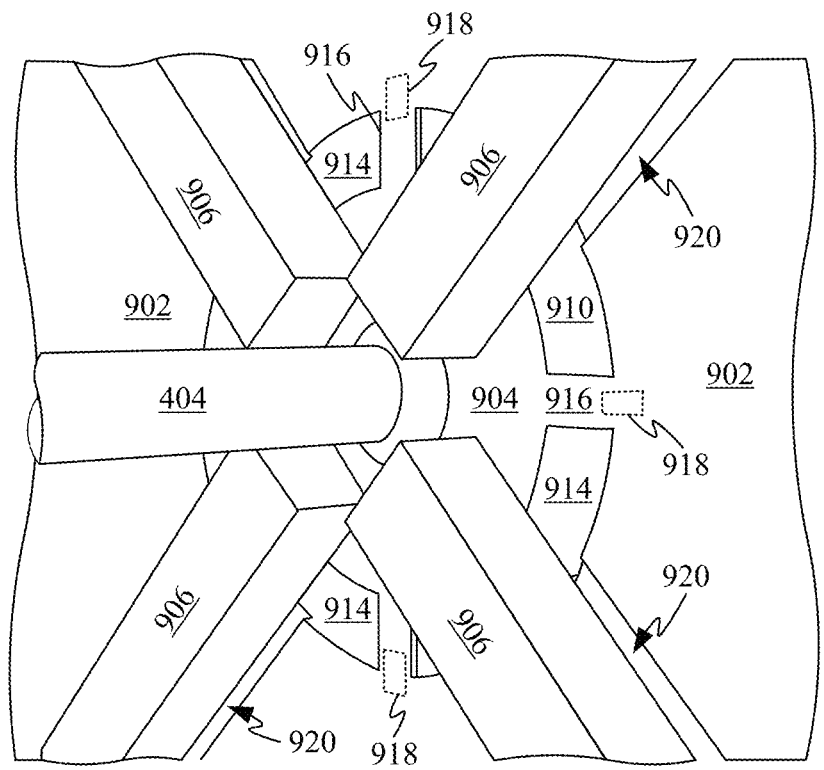
FIG. 9D shows a close-up view of how the hub is attached to the frame by flexures as well as where piezoelectric strips are attached to the hub.

FIG. 9D shows a close-up view of how hub 904 is attached to frame 902 by flexures 916 as well as where piezoelectric strips 906 are attached to hub 904. Strain sensors 918 can be adjacent to or extending across flexures 916. Strain sensors 918 can be configured to monitor movement of hub 904 and indirectly monitor movement of tapered fiber 404. Strain sensors 918 can be configured to monitor twisting and flexing of flexures 916. The twisting and flexing of flexures 916 monitored by strain sensors 918 can be used to carry out closed loop feedback control to achieve a consistent desired scan pattern. In some embodiments, each flexure can include multiple strain sensors to measure different types of stresses being experienced by each of flexures 916. FIG. 9D also shows a close-up view of how piezoelectric strips 906 are arranged within channels 920. Channels 920 can be configured to accommodate lateral motion of piezoelectric strips 906 during actuation of hub 904.

Figure 9E:
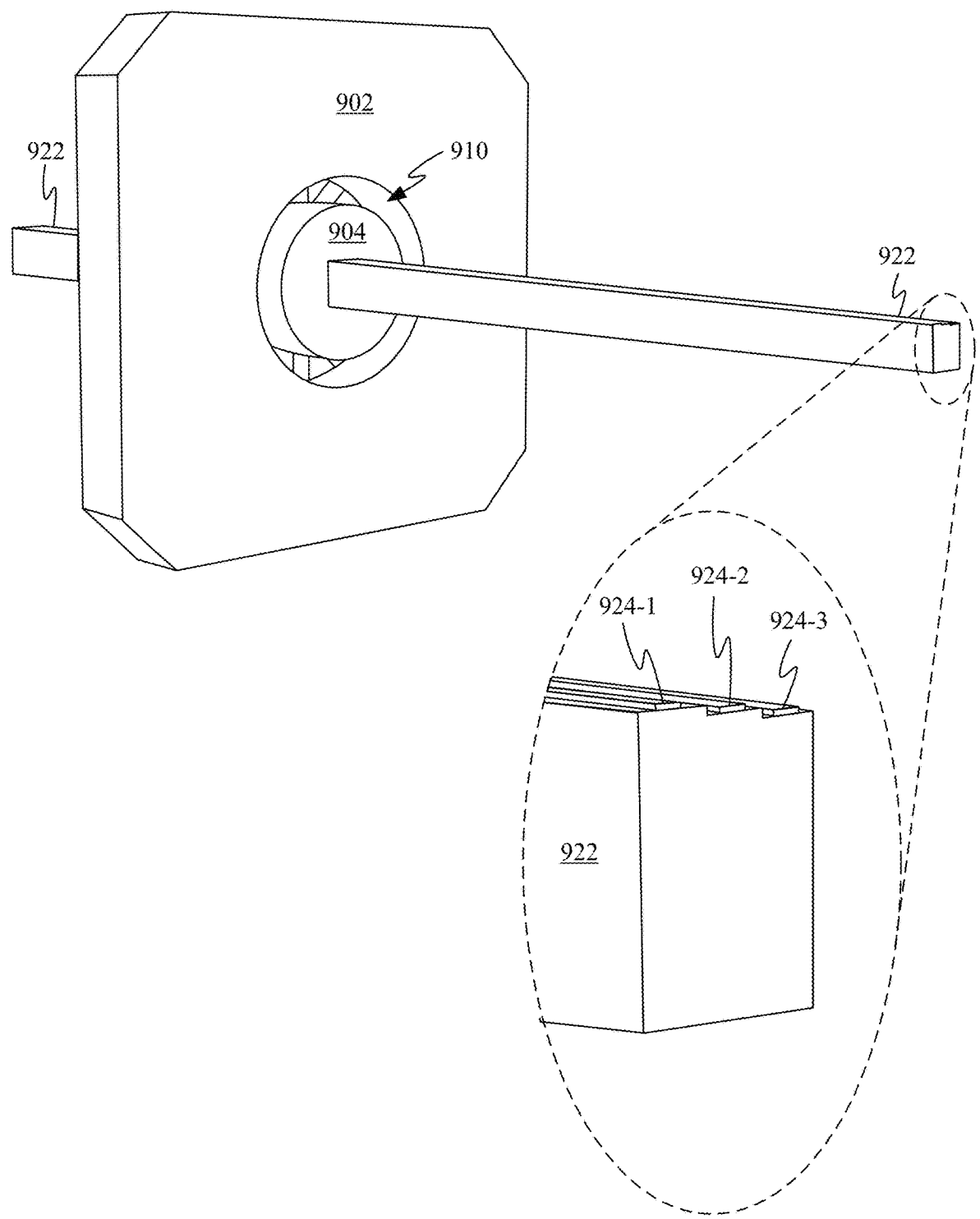
FIG. 9E shows an alternative configuration in which tapered optical fiber is replaced by a cantilevered beam.

FIG. 9E shows an alternative configuration in which tapered optical fiber 404 is replaced by cantilevered beam 922. In some embodiments, cantilevered beam 922 can be formed from a length of Silicon or Silicon Carbide. Cantilevered beam 922 can also be induced by an actuator to follow a spiral scan pattern similar to the scan pattern depicted in FIG. 4D. Cantilevered beam 922 can include multiple waveguides 924. In some embodiments, a surface of cantilevered beam 922 can include a stepped structure that allows for vertical separation of waveguides 924-1, 924-2 and 924-3. In one configuration, each of waveguides 924 can be configured to emit light of a different color, such as red, green and blue. In another configuration, multiple waveguides 924 can be configured to simultaneously generate data corresponding to three different pixels, thereby increasing a rate at which an image can be generated and/or increase a spatial resolution of the image generated by waveguides 924. While an exemplary configuration with three waveguides along an upper surface of cantilevered beam 922 is depicted, other configurations are also possible. For example, configurations with one, two, four or more waveguides are also possible. Furthermore, waveguides 924 could also be embedded and or distributed within or across different sides of cantilevered beam 922. It should be appreciated that cantilevered beam 922 could also be utilized with the other actuators depicted in this application, such as piezoelectric motion actuator assembly 500.

Figure 10A:
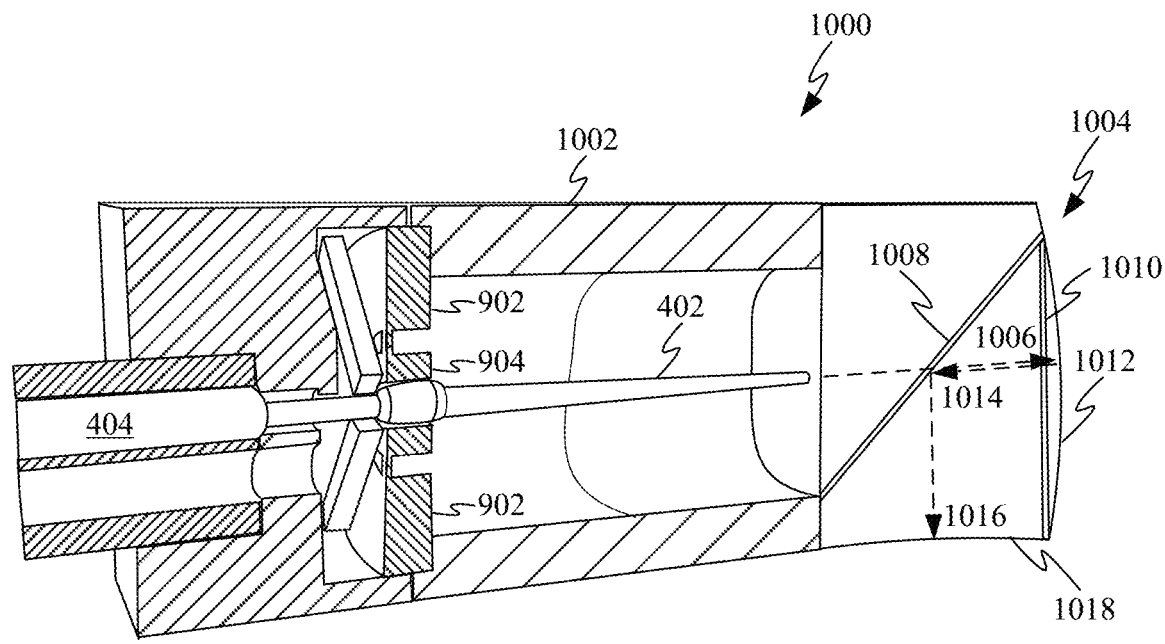
FIG. 10A shows a partial cross-sectional view of an optical scanning system.

FIG. 10A shows a partial cross-sectional view of an optical scanning system 1000. Instead of having distal end 402 of tapered optical fiber 404 extend through eyepiece 108, distal end 402 of tapered optical fiber 404 can extend through a channel defined by baffles 1002 sized to accommodate a scan pattern of distal end 402. Light emitted by distal end 402 can be received by prism 1004, which is configured to redirect light received from distal end 402 by an angle of about 90 degrees. Light 1006 received by prism 1004 passes through a polarization selective reflector 1008, which is configured to allow light only polarized in one direction to pass therethrough. Light then passes through a quarter wave plate (QWP) 1010 before being incident on a mirrored surface 1012. The QWP 1010 transforms the linearly polarized light that has passed through the polarization selective reflector 1008 to circularly polarized light. Reflection by the mirrored surface 1012 switches the handedness of the circularly polarized light and upon passing once again through the QWP 1010 the circularly polarized light 1014 is converted to linearly polarized light having a polarization orientation that is opposite to the initial polarization orientation and therefore the light is reflected by the polarization selective reflector 1008 (as opposed to passing through the polarization filter 10008). The polarization selective reflector 1008 reflects light 1016 to an exit surface 1018. It should be noted that dashed arrows 1006, 1014 and 1016 are merely shown for illustrative purposes only and that a ray-traced representation of the light would have a different appearance but still proceed through and be reflected off polarization selective reflector 1008 in the same manner.

Figure 10B:
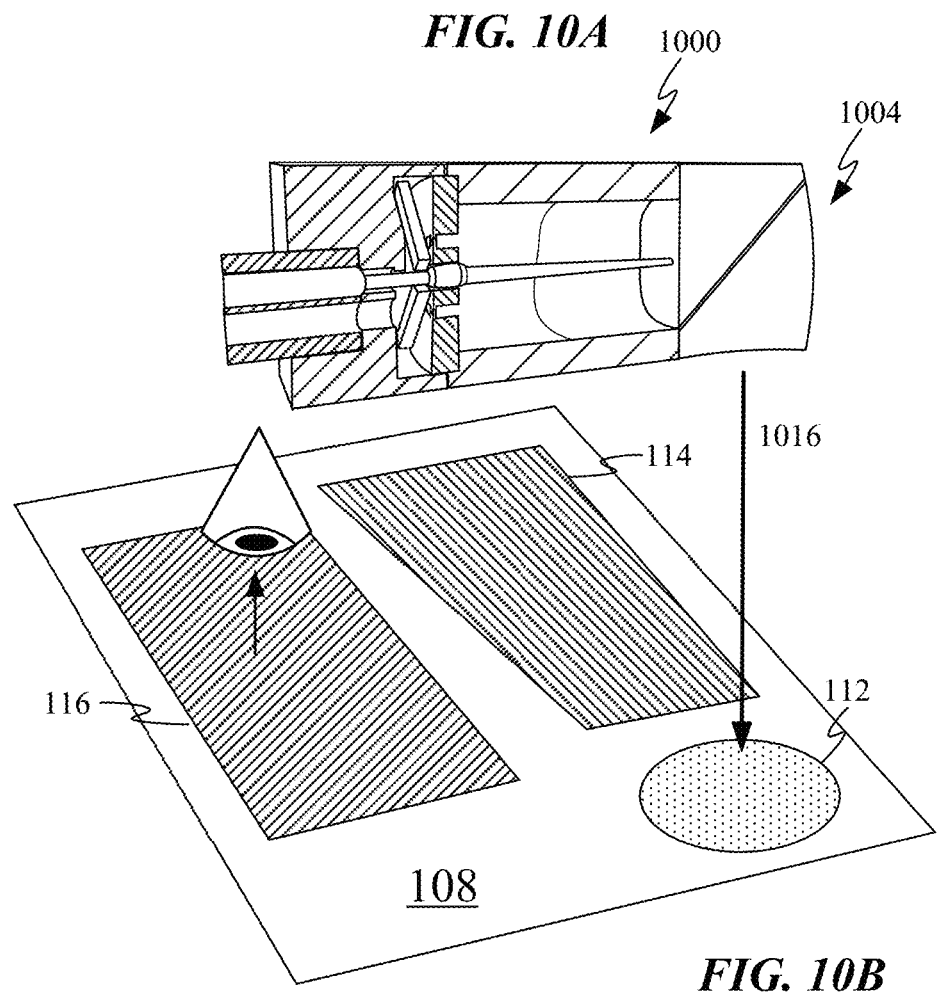
FIG. 10B shows the optical scanning system shown in FIG. 10A optically coupled to an eyepiece of augmented reality glasses.

FIG. 10B shows how light 1012 exiting prism 1004 is directed toward and into incoupling grating 112 of eyepiece 108. It should be appreciated that incoupling grating 112 and optical scanning system 1000 can be substantially smaller than represented when compared with an overall size of eyepiece 108 but that the sizes are shown as indicated to show one possible orientation of optical scanning system 1000 relative to eyepiece 108. Once light 1012 is received at incoupling grating 112, the light is redirected toward OPE 114, which then sends the light to EPE 116 at which point the light generated by optical scanning system 1000 is outcoupled toward a user's eye, as depicted.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A head mounted display with an optical scanner comprising:
   a frame;
   a hub;
   at least one transducer coupled to the frame and to the hub; and
   a cantilever including a proximal end coupled to the hub and a light-emitting free distal end, wherein the at least one transducer extends in a direction perpendicular to the cantilever from the hub to the frame.

2. The optical scanner of claim 1 further comprising at least one flexure coupling the frame to the hub.

3. The optical scanner of claim 2 wherein the at least one flexure includes a plurality of flexures coupling the frame to the hub.

4. The optical scanner of claim 2 wherein the frame, the hub and the at least one flexure are integrally formed.

5. The optical scanner of claim 4 wherein the at least one flexure has at least a first thickness and the hub has at least a second thickness, wherein the second thickness is greater than the first thickness and the first thickness and the second thickness are measured in a direction parallel to a rest position of a longitudinal axis of the cantilever.

6. The optical scanner of claim 2 wherein the at least one flexure extends from the hub to the frame and extends in a direction that is radial with respect to a rest position of a longitudinal axis of the cantilever.

7. The optical scanner of claim 1 wherein the hub is annular in shape, defining a hole, and the proximal end of the cantilever is secured in the hole.

8. The optical scanner of claim 1 wherein the at least one transducer includes a plurality of transducers.

9. The optical scanner of claim 1 wherein the at least one transducer includes a piezoelectric transducer.

10. The optical scanner of claim 1 wherein the at least one transducer comprises a heater including material that exhibits a property of expanding when heated.

11. The optical scanner of claim 1 wherein the at least one transducer has an elongated shape and a longitudinal axis of the at least one transducer extends substantially radially with respect to a rest position of a longitudinal axis of the cantilever.

12. The optical scanner of claim 1 wherein the cantilever comprises a fiber optic.

13. The optical scanner of claim 1 wherein the proximal end has a larger transverse dimension than the light-emitting free distal end.

14. Augmented reality glasses comprising:
   a frame;
   a hub;
   an eyepiece including an incoupling grating, a hole formed in the incoupling grating of the eyepiece;
   a transducer coupled to the frame and to the hub capable of generating mechanical movement;
   a cantilever including a proximal end coupled to the transducer and a distal end, wherein the transducer extends in a direction perpendicular to the cantilever from the hub to the frame; and
   a light-emitting member disposed on the cantilever, wherein the cantilever extends through the hole formed in the incoupling grating of the eyepiece.

15. The augmented reality glasses of claim 14 further comprising a waveguide arranged along the cantilever, wherein the light-emitting member includes a tip of the waveguide.

16. The augmented reality glasses of claim 14 wherein the cantilever comprises an optical waveguide and the light-emitting member includes an emitting, distal end of the optical waveguide.

17. The augmented reality glasses of claim 16 wherein the transducer comprises a piezoelectric tube and the optical waveguide extends through the piezoelectric tube.

18. The augmented reality glasses of claim 14 further comprising:
   a reflective surface arranged facing the light-emitting member; and
   a lens disposed between the reflective surface and the incoupling grating.

19. The augmented reality glasses of claim 18 wherein the lens includes a central hole and the cantilever extends through the central hole in the lens.

20. The augmented reality glasses of claim 18 wherein the reflective surface and the lens, in combination, are configured to collimate light emitted by the light-emitting member.

* * * * *